US010248575B2

(12) United States Patent
Brandt et al.

(10) Patent No.: US 10,248,575 B2
(45) Date of Patent: *Apr. 2, 2019

(54) SUSPENDING TRANSLATION LOOK-ASIDE BUFFER PURGE EXECUTION IN A MULTI-PROCESSOR ENVIRONMENT

(71) Applicant: International Business Machines Corporation, Armonk, NY (US)

(72) Inventors: Uwe Brandt, Stuttgart (DE); Ute Gaertner, Schoenaich (DE); Lisa C. Heller, Rhinebeck, NY (US); Markus Helms, Boeblingen (DE); Thomas Köhler, Holzgerlingen (DE); Frank Lehnert, Weil im Schoenbuch (DE); Jennifer A. Navarro, Poughkeepsie, NY (US); Rebecca S. Wisniewski, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,963

(22) Filed: Feb. 20, 2018

(65) Prior Publication Data

US 2018/0365166 A1    Dec. 20, 2018

Related U.S. Application Data

(63) Continuation of application No. 15/625,444, filed on Jun. 16, 2017.

(51) Int. Cl.
*G06F 12/1009*    (2016.01)
*G06F 12/1027*    (2016.01)

(52) U.S. Cl.
CPC ...... *G06F 12/1027* (2013.01); *G06F 12/1009* (2013.01); *G06F 2212/65* (2013.01); *G06F 2212/68* (2013.01)

(58) Field of Classification Search
CPC ............ G06F 12/1027; G06F 12/1009; G06F 2212/65; G06F 2212/68
See application file for complete search history.

(56) References Cited

U.S. PATENT DOCUMENTS

| 5,317,705 A | 5/1994 | Gannon et al. |
| 6,668,314 B1 | 12/2003 | Brewer |

(Continued)

FOREIGN PATENT DOCUMENTS

CN    1304962 C    3/2007

OTHER PUBLICATIONS

Jacobi et al., "Cache Structure Using a Logical Directory," U.S. Appl. No. 15/625,223, filed Jun. 16, 2017.

(Continued)

*Primary Examiner* — Larry T MacKall
(74) *Attorney, Agent, or Firm* — Nathan M. Rau

(57) ABSTRACT

Disclosed herein is a method for operating translation look-aside buffers, TLBs, in a multiprocessor system. A purge request is received for purging one or more entries in the TLB. When the thread doesn't require access to the entries to be purged the execution of the purge request at the TLB may start. When an address translation request is rejected due to the TLB purge, a suspension time window may be set. During the suspension time window, the execution of the purge is suspended and address translation requests of the thread are executed. After the suspension window is ended the purge execution may be resumed. When the thread requires access to the entries to be purged, it may be blocked for preventing the thread sending address translation requests to the TLB and upon ending the purge request execution, the thread may be unblocked and the address translation requests may be executed.

1 Claim, 6 Drawing Sheets

(56) References Cited

U.S. PATENT DOCUMENTS

| | | |
|---|---|---|
| 8,140,834 B2 | 3/2012 | Heller et al. |
| 8,380,907 B2 | 2/2013 | Heller et al. |
| 8,407,701 B2 | 3/2013 | Gaertner et al. |
| 8,572,624 B2 | 10/2013 | Heller et al. |
| 9,372,805 B2 | 6/2016 | Heller et al. |
| 2009/0216995 A1 | 8/2009 | Heller et al. |
| 2014/0025922 A1 | 1/2014 | Heller et al. |
| 2014/0129786 A1 | 5/2014 | Deutschle et al. |
| 2014/0129798 A1* | 5/2014 | Deutschle ............ G06F 12/1027 711/207 |
| 2015/0264154 A1 | 9/2015 | Anand et al. |
| 2016/0048453 A1 | 2/2016 | Koehler et al. |
| 2016/0139955 A1 | 5/2016 | Fee et al. |
| 2017/0371805 A1 | 12/2017 | Jayasena et al. |

OTHER PUBLICATIONS

Brandt et al., "Suspending Translation Look-Aside Buffer Purge Execution in a Multi-Processor Environment," U.S. Appl. No. 15/625,444, filed Jun. 16, 2017.

Brandt et al., "Suspending Translation Look-Aside Buffer Purge Execution in a Multi-Processor Environment," U.S. Appl. No. 15/856,140, filed Dec. 28, 2017.

List of IBM Patents or Patent Applications Treated as Related, Signed Feb. 20, 2018, 2 pages.

\* cited by examiner

SUSPENDING TRANSLATION LOOK-ASIDE BUFFER PURGE EXECUTION IN A MULTI-PROCESSOR ENVIRONMENT

BACKGROUND

The present disclosure relates to the field of digital computer systems, and more specifically, to a method for operating translation look-aside buffers (TLBs).

Recent microprocessor architecture allows software to use so called "virtual" (or sometimes called "logical") addresses to reference memory locations. The memory access itself is done using a "physical" (or sometimes called "absolute") address. To translate between the two, typically a TLB data structure is involved. The process of translating is sometimes called Dynamic Address Translation (DAT), in particular in the IBM z/Architecture.

TLB purge requests are executed atomically in that a purge request is not suspended once it has been started and it cannot be suspended by TLB lookup/write requests. This avoids the problem that a TLB lookup may hit on a stale entry if a purge would have been suspended. However, purges may take up to 1000 p-clocks. In this time no translations can be done since the purge-engine is blocking the TLB lookup/write pipeline. In a worst case scenario the core does not make any progress until the purge has been finished.

SUMMARY

Various embodiments provide a method for operating translation look-aside buffers, system and computer program product as described by the subject matter of the independent claims. Advantageous embodiments are described in the dependent claims. Embodiments of the present invention can be freely combined with each other if they are not mutually exclusive.

In one aspect, the disclosure relates to a method for operating translation look-aside buffers, TLBs, in a multi-processor system, the multiprocessor system comprising at least one core (processor core) each supporting at least one thread. The method comprises:
  receiving a purge request for purging one or more entries in the TLB;
  determining if the thread requires access to an entry of the entries to be purged;
  in case the thread does not require access to the entries to be purged:
    starting execution of the purge request in the TLB;
    setting a suspension time window;
    suspending the execution of the purge during the suspension time window;
    executing address translation requests of the thread during the suspension time window;
    resuming the purge execution after the suspension window is ended;
  in case the thread requires access to the entries to be purged:
    blocking the thread for preventing the thread sending address translation requests to the TLB;
    upon ending the purge request execution, unblocking the thread and executing the address translations requests of the thread.

In another aspect, the disclosure relates to a computer program product comprising a computer-readable storage medium having computer-readable program code embodied therewith, the computer-readable program code configured to implement all of steps of the method according to preceding embodiments.

In another aspect, the disclosure relates to a system for operating translation look-aside buffers, TLBs, comprising at least one core each having at least one thread. The system is configured for:
  receiving a purge request for purging one or more entries in the TLB;
  determining if the thread requires access to an entry of the entries to be purged;
  in case the thread does not require access to the entries to be purged:
    starting execution of the purge request in the TLB;
    setting a suspension time window if an address translation request of the thread is rejected due to the TLB purge;
    suspending the execution of the purge during the suspension time window;
    executing address translation requests of the thread during the suspension time window;
    resuming the purge execution after the suspension window is ended;
  in case the thread requires access to the entries to be purged:
    blocking the thread for preventing the thread sending address translation requests to the TLB;
    upon ending the purge request execution, unblocking the thread and executing the address translation requests of the thread.

BRIEF DESCRIPTION OF THE DRAWINGS

In the following embodiments the disclosure is explained in greater detail, by way of example only, making reference to the drawings in which.

DETAILED DESCRIPTION

Figure 1:
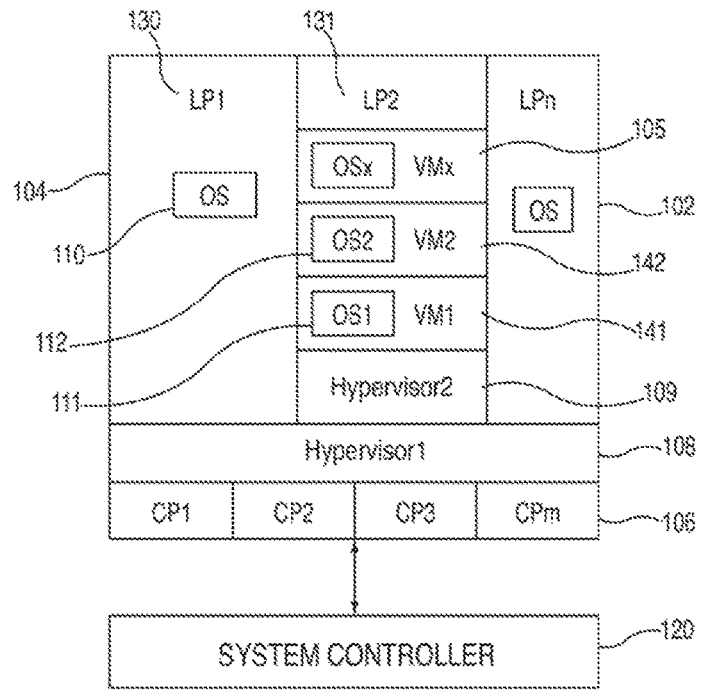
FIG. 1 depicts a computing environment that may be implemented by an example of the present disclosure.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

In one example, the multiprocessor system comprises two processor cores, wherein the purge request is received by one core from another core of the two cores. In another example, the purge request may be received by a thread of a core from another thread of the core. In another example, the multiprocessor system comprises more than two processor cores, wherein the purge request is broadcast by one core of the cores to the remaining cores.

A thread requiring access to an entry of the entries to be purged by the received purge request may be referred to as "honored thread". A thread which does not require access to entries to be purged by the received purge request may be referred to as "filtered thread". An address translation request is a request for translating a virtual address into an absolute address using the TLB.

The term "quiesce" refers to the mechanisms used to force all processors or cores or treads in a multi-processor system (e.g., those processors that have access to the data structure (e.g., table) being updated) to stop their activity.

The present method may provide better performance advantages in the presence of purge requests. This is by contrast to conventional methods where all cores are suspended during purge requests regardless of the configuration status of the threads. With the present method the core may make considerable progress until the purge has been finished.

According to one embodiment, the at least one core supports a second thread, in case the first thread does not require access to the TLB entries to be purged and the second thread requires access to an entry to be purged, the method further comprises, before starting the execution of the purge request at the TLB: blocking both the first and second threads for preventing them sending requests to the TLB; in case the purge request has started by both the first and second thread, unblocking the first thread. This embodiment may enable at least part of threads to progress and therefore avoids interrupting all threads. The two threads are both blocked in order to make use of a simplified architecture of the core. In another example, the second thread may be part of another core of the multiprocessor system.

In another embodiment, in case the first thread requires access to at least an entry of the entries to be purged and the second thread does not require access to the entries to be purged. The method further comprises: upon the blocking of the first thread, starting execution of the purge request at the TLB; setting a suspension time window if an address translation request by the second thread is rejected due to the TLB purge; suspending the execution of the purge during the suspension time window; executing address translation requests of the second thread during the suspension time window; resuming the purge execution after the suspension window is ended. This embodiment may enable at least part of threads to progress and therefore avoids interrupting all threads.

According to one embodiment, the determining if the thread requires access to an entry of the entries to be purged is performed based on a current state of the thread, the method further comprising before the purge request ends, maintaining the state of the thread un-changed. The determining if the thread requires access to an entry of the entries to be purged may additionally be based on a current state of the thread that sent the purge request. This may for example be performed by checking the context of the thread against the context information sent with the purge request.

According to one embodiment, the method further comprising in response to receiving an assignment request for assigning the thread to a process requiring access to the TLB, wherein the maintaining comprises blocking the assignment request.

For example, as long as the purge request is active these assignment requests are blocked. The purge request is received from another thread. The other thread may send the purge request as part of an overall purging process that may be executed in different components of the multiprocessor system. For example, for updating tables such as page tables, the other thread may send the purge request such that the receiving thread may adapt or update the local TLB accordingly. This overall process may have a given execution lifetime which is the period from the start to the end of the overall process. The execution of the purge request at the TLB is performed during a time period. Thus, in one example the purge request is referred as being an active purge request during the whole execution lifetime. For example, for indicating that the purge request is active the purge request may be set to a pending state in the multiprocessor system during the execution lifetime. But if, in another example, the purging at the TLB takes longer than the purge request is pending in the system (e.g. since it gets suspended many times) the purge request is active as long as the purge is active at the TLB (e.g. during the time period).

These embodiments may prevent changing the state of a filtered thread to become a honored thread which may render the architecture even more complex.

According to one embodiment, the assignment request is received from a Start Interpretive Execution (SIE) component of the multiprocessor system for assigning the thread to a virtual processing unit (PU). This embodiment may seamlessly be integrated in exiting virtualized environments. For example, although the thread in a current state is a filtered thread as it serves an old guest it may now become honored thread by a new guest. So, if the new guest would be allowed, a hit on stale entries may happen. This may be prevented by the present method.

According to one embodiment, blocking the thread is performed using firmware instructions. In one example, the firmware instructions may comprise millicode instructions.

According to one embodiment, the method further comprises providing a branch point having two states, wherein blocking the thread comprises setting the branch point to the first state, and using firmware instructions for reading the state of the branch point for performing the blocking, and upon ending the purge request execution, setting the branch point to the second state; using the firmware instructions for reading the second state of the branch point for performing the unblocking. The branch point provides a hardware interface to the firmware instructions. The state of the branch point is read by the firmware instructions, and based on the state that has been read the thread (which is determined to be honored thread) may be blocked.

According to one embodiment, the method further comprises providing another branch point having two states, wherein blocking the assignment request comprises setting the other branch point to a state of the two states, and using firmware instructions for reading said state of the branch point for performing the blocking of the assignment request.

According to one embodiment, wherein the setting of the suspension time window is performed in response to an address translation request of the thread being rejected due to the TLB purge. The TLB purging refers to the execution of the TLB purge request in the TLB. In other terms, if a translation request comes in while a purge is running the translation request gets rejected in the first place since the TLB pipeline is used by the purge request. This reject is used to put a running purge request into the suspend state. The suspend state is not reached immediately and may take a while. A rejected request gets periodically reissued until it gets finally accepted. Once the reissued translation request falls into the suspension window it can be accepted since the TLB pipeline is not occupied by the purge request anymore.

According to one embodiment, the rejected address translation request is recycled during a recycling time window, the recycling time window is smaller than the suspension time window, the executing of the address translation requests of the thread comprises executing the recycled address translation request.

According to one embodiment, the method further comprises programming the suspension time window.

According to one embodiment, setting the suspension time window comprises providing a level signal having a predefined activation time period during which the level signal is active, wherein the suspension time window is the activation time period. For example, the level signal may be carried by a level sensitive LSU control line (LSU stands for load and store unit of the core). As long as the control line is active the purge request is suspended. This feature may be advantageous when used for translation requests issued in bursts.

FIG. 1 depicts a computing environment 100 that may be implemented by an example of the present disclosure. Computing environment 100 is a multiprocessor system which may be based, for instance, on the z/Architecture offered by International Business Machines Corporation.

As one example, computing environment 100 includes a central processor complex (CPC) 102 coupled to a system controller 120. Central processor complex 102 includes, for instance, one or more partitions 104 (e.g., logical partitions LP1-LPn), one or more central processors 106 (e.g., CP1-CPm), and a first-level hypervisor 108 (e.g., a logical partition manager), each of which is described below.

Each logical partition 104 is capable of functioning as a separate system. That is, each logical partition can be independently reset, initially loaded with an operating system, if desired, and operate with different programs. An operating system, hypervisor or application program running in a logical partition appears to have access to a full and complete system, but, only a portion of it is available. A combination of hardware and Licensed Internal Code (commonly referred to as firmware, microcode or millicode) keeps a program in a logical partition from interfering with a program in a different logical partition. This allows several different logical partitions to operate on a single or multiple physical processors in a time sliced manner. A second-level hypervisor can run in a partition 104 and provide the same function, such as transparent time-slicing of resources between multiple operating systems (e.g. OS1-OSx running in virtual machines VM1-VMx 105) and isolation of operating systems from one another, within that logical partition.

In this particular example, logical partition 1 (LP1) 130 has a resident operating system 110 and logical partition 2 (LP2) 131 runs a second-level hypervisor2 109 which in turns creates virtual machines 141 and 142 each of which runs its own resident operating systems 111 and 112. Any number of the logical partitions may run a second-level hypervisor. In one example, hypervisor2 109 is the z/VM hypervisor, offered by International Business Machines Corporation. In addition, the resident operating systems running in the various logical partitions may differ and, when running under a second-level hypervisor, the resident operating systems within a single partition may also differ. In one example, operating system 110 is the z/OS operating system, which is offered by International Business Machines Corporation. In another embodiment, operating systems 111 and 112 are Linux.

Central processors 106 are physical processor resources that are allocated to the logical partitions. For instance, a logical partition 1 (LP1) 130 includes one or more logical processors, each of which represents all or a share of physical processor resources 106 allocated to the partition. The logical processors of a particular partition 104 may be either dedicated to the partition, so that the underlying processor resource is reserved for that partition; or shared with another partition, so that the underlying processor resource is potentially available to another partition. When a second-level hypervisor2 109 is running in logical partition 2 (LP2) 131, it can provide the same virtualization of resources provided by hypervisor1 to logical partitions 104 to the operating systems 111 and 112 running in virtual machines 141, 142 within that partition. As at the first level, each virtual machine may include multiple virtual processors. The term "virtual CPU" is used herein to refer generically to a logical or virtual processor.

Logical partitions 104 are managed by hypervisor 108 and 109 implemented by microcode running on processors 106. Logical partitions 104 and hypervisor 108 each comprise one or more programs residing in respective portions of central storage associated with the central processors. One example of hypervisor 108 is the Processor Resource/Systems Manager (PRISM), offered by International Business Machines Corporation.

System controller 120, which is coupled to the central processor complex, includes centralized logic responsible for arbitrating between different processors issuing requests. For instance, when system controller 120 receives a quiesce request, it determines that the requester is the initiating processor for that request and that the other processors are receiving processors; it broadcasts messages; and otherwise, handles requests.

For example, when a second-level hypervisor 109 is running in a partition and is running a program in a virtual machine, the second-level hypervisor is referred to as guest1 and the program running in its virtual machine as guest2.

Figure 2:
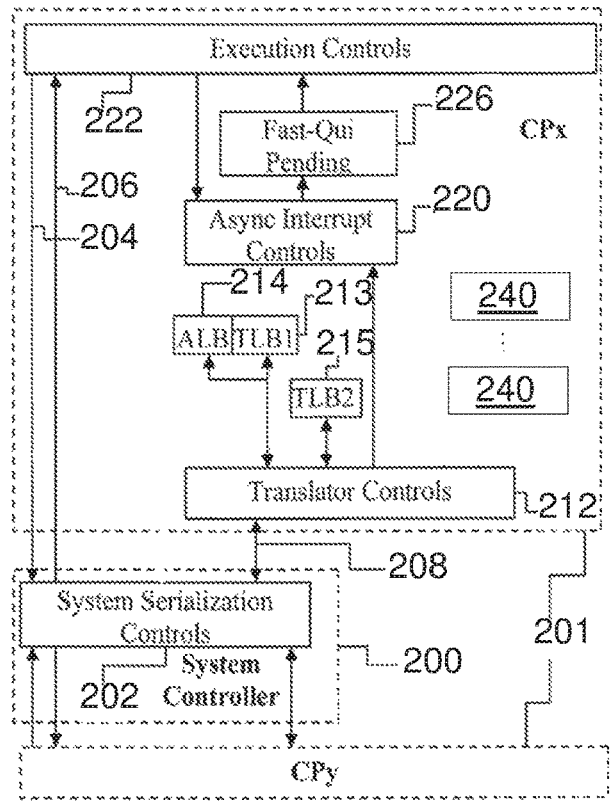
FIG. 2 depicts one example of a system controller coupled to a plurality of central processors.

FIG. 2 depicts one example of a system controller 200 coupled to a plurality of central processors (CPUs) or cores 201 (such as CP1-CPm). In this example, two cores CPx and CPy are depicted. However, it will be understood that more than two processors may be coupled to system controller 200.

System Controller 200 includes various controls including, for instance, system serialization controls 202. The system serialization controls 202 are used to ensure that operations that are to be serialized, such as Invalidate Page Table Entry (IPTE), Invalidate DAT Table Entry (IDTE), Set Storage Key Extended (SSKE), or Compare and Swap and Purge (CSP and CSPG) instructions, are serialized, such that only one such instruction is in progress at one time in the computing environment. It also monitors the sequence of events for that operation.

System controller 200 is coupled to each core 201 via various interfaces. For instance, an interface 204 to the controller 200 is used by the Licensed Internal Code in a central processor to send "control" commands, which specify an action to be taken, and to send "sense" commands, which return information from the controller 200. Another interface is a response bus 206, which is used to return information from the controller 200 for the "sense" commands. The response bus 306 is also used to communicate command status for "control" commands, and may be set from a plurality of sources within the controller 200, including the system serialization controls 202. A core 201 can use this interface to sense the state of the system serialization controls 202 in system controller 200.

A further interface is interface 208, which provides commands to translator controls 212 of core 201. Translator controls 212 process commands, in response to the signals. In one example, translator controls 212 process commands that affect one or more buffers, such as Translation Lookaside Buffers (TLBs) 213 and 215 and Access-Register-Translation Look-aside Buffers (ALBs) 214.

In addition to translator controls 212, core 201 includes various other controls, including, for instance, asynchronous interruption controls 220 and execution controls 222. When the translator controls 212 receive a quiesce purge request (also referred to as fast-quiesce (FQUI) purge request) from the controller 202, the translator controls 212 process the request in accordance with at least part of the present method for determining actions to be performed at this core 201. These actions may be sent to the asynchronous interruption controls 220. An action of the actions may for example comprise an interruption to core 201. In response to this action, asynchronous interrupt controls 220 cause an internal fast-quiesce interruption 226 to be pending in the receiving processor, which in turn, causes execution controls 222 to suspend program instruction processing, at the next interruptible point.

The core 201 may comprise at least two translation lookaside buffers of which a first one (TLB1) 313 is a first level buffer and a second one (TLB2) 315 is a second level translation lookaside buffer arranged to feed said first one with address information in case of a missing address of the first one. For example, the address translation tables in memory may be a multi-tier structure. For example, for a two-tier table, the first-level table, called a segment table, contains entries, which each map a MB of memory by point to a second-level table, called a page table, which contains 256 entries mapping 4 KB of memory. The TLB2 may have two types of entries: 1 MB segments and individual 4 KB pages. When a translation is not available in first-level TLB (TLB1), TLB2 is searched for a 4 KB page entry that provides the required translation. If not, then TLB2 is searched for a segment entry for the segment containing the address to be translated. If such an entry is found, then the translation using the tables in memory is short-circuited because the appropriate page table can be accessed directly without having to access the segment table in memory. And TLB1 may comprise a 2-dimensional array of entries, e.g., 32 entries long and 4 entries wide. Each entry contains a virtual address that was translated and the absolute address that it translated to.

As illustrated in FIG. 2, each core 201 may support one or more threads 240. Each thread 240 has an independent context or state defined for example by program counter, registers, stack space of the core 201. For example, each thread may require a means for obtaining instruction data. This may consist of an engine to fetch instructions from cache or embedded memory which is followed by instruction decode hardware. For example, instructions for a thread may be fetched by an instruction fetch unit of the thread and sent by an instruction decoder and resource interlock to the execution controls 222.

For example, a thread 240 may be assigned to a given virtual processing unit via a SIE component of the multi-processor system 100. Purge requests may for example be submitted by guest virtual machines and received at the thread 240.

Figure 3:
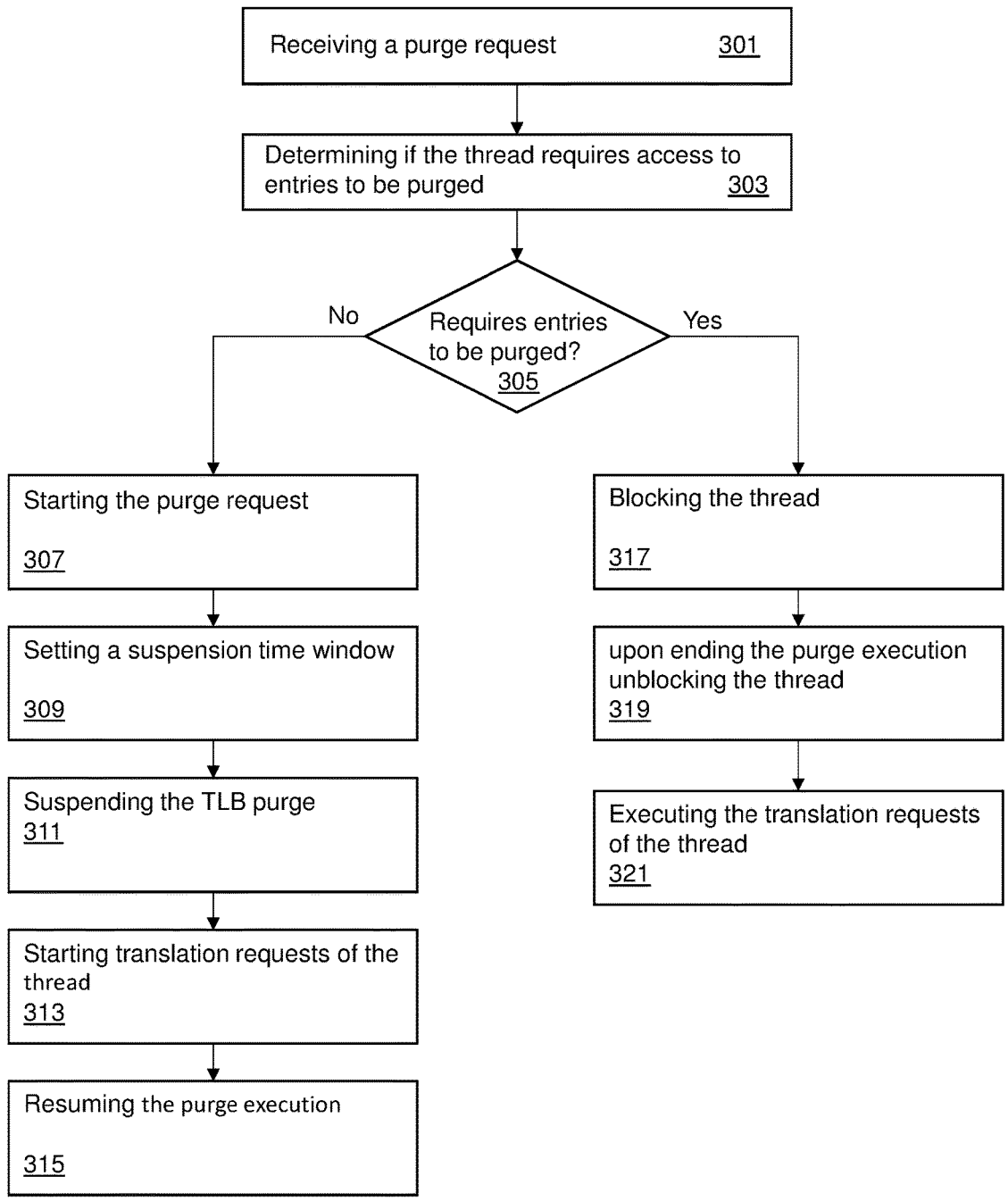
FIG. 3 is a flowchart of a method for operating a TLB in a multiprocessor system.

FIG. 3 is a flowchart of a method for operating a translation look-aside buffer, TLB (e.g. TLB2 215) in a multi-processor system e.g. 100.

In step 301, a purge request may be received. The purge request is for purging one or more entries in the TLB2 315. The purge request comprises a quiesce request in order to quiesce or interrupt the core 201. The purge request may for example be received by translations controls 212 at receiving core CPx from another core CPy. In this example of FIG. 3, receiving core CPx supports a single thread 240. The other core CPy may trigger the purge request in response to receiving the request from a guest such as guest two level machine. The purge request may for example be first received at the system controller 200 and may then be sent by system serialization controls 202 to the translator controls 212 of the core CPx. For example, the purge request may be received from a processor operating at the guest2 level. In one example, the two cores CPx and CPy may run in the same guest2 multi-processor configuration.

In step 303, the translator controls 212 may determine if the thread 240 supported by core CPx requires access to an entry of the entries to be purged of the TLB (e.g. TLB2 215). This may for example be performed by checking the context of the thread 240 against the context information sent with (or comprised in) the purge request. This may also be performed by further checking the state or context of the thread that sent the purge request. For example, this context compare may indicate that the thread has translation requests to be performed using TLB (e.g. TLB2 215) entries affected by the received purge request. The purge request may for example be received or may be ordered to be executed before executing the translation requests and thus the translation requests may have to be performed after execution of the purge request if they require access to the entries to be purged.

In case (inquiry 305) the thread 240 does not require access to the entries to be purged steps 307-315 are executed otherwise steps 317-321 are executed.

In step 307, the execution of the purge request may start at the TLB. For example, the purge request may be sent by Fast-Qui Pending block 226 to the TLB for execution.

In step 309, a suspension time window may be set. Step 309 is set after step 307. For example, step 309 may be performed if the thread's translation request gets rejected due to the TLB purge. If a translation request comes in while the purge request is running, the translation request gets rejected in the first place since the TLB pipeline is used by the purge request. This reject is used to put the running purge request into a suspend state. The purge stays in this suspended state until the suspension time window has been elapsed. During this time a purge engine does not occupy the TLB pipeline (e.g. the TLB2 pipeline) so that incoming translation requests can be processed during the suspension time window.

In step 311, the execution of the TLB purge is suspended during the suspension time window such that translation requests of the thread 240 may be started in step 313 during the suspension time window. For example, the translation requests of the thread 240 may not be rejected during the suspension time window.

In step 313, a translation may be started if it comes in while the purge engine is suspended (311) (e.g. the execution of the TLB purge is suspended by suspending the purge engine that controls the TLB purge).

In step 315, the purge execution may be resumed after the suspension window is ended. For example, the suspension time window may be defined such that all translation requests in the current state of the thread 240 can be executed during the suspension time window. In one example, steps 309-315 may be repeated if other translation requests get rejected after resuming the purge execution in the TLB by the filtered thread.

In case the thread 240 requires access to the entries to be purged, the thread 240 may be blocked in step 317 for preventing the thread 240 sending translation requests to the TLB 215. This may for example be performed by using a firmware/millicode routine at the core 201 for stopping/blocking the translation requests of the thread 240.

And upon ending the purge request execution at the TLB 215, the thread may be unblocked in step 319 and the translation requests of the thread 240 may be executed in step 321 (e.g. the translation requests may be issued again). The firmware or millicode routine prevents translation requests from being issued. From a purge suspension point of view a reject will put the purge engine into the suspension state. So that means that a honored thread must not issue translation requests before the end of the purge request execution.

For example, if a translation request comes in while the purge request is running the translation request gets rejected since the TLB pipeline is used by the purge request. A rejected request gets periodically reissued until it gets finally accepted. After the honored thread has been unblocked translation requests can be processed again in step 321.

Figure 4A:
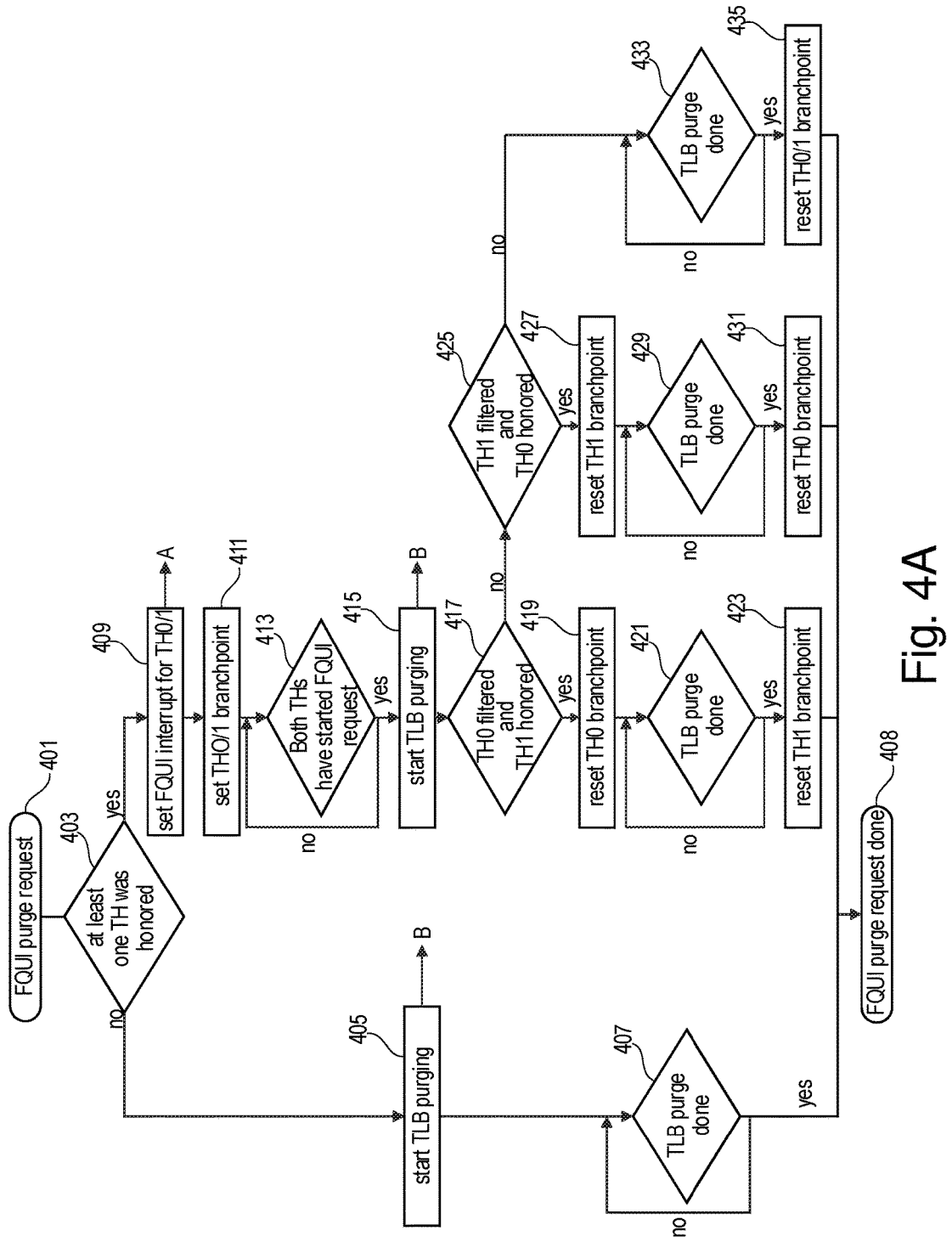
FIG. 4A is a flowchart of a method for controlling hardware purge suspension.

FIG. 4A is a flowchart of a method for controlling hardware purge suspension e.g. in multiprocessor system 100.

In step 401 a purge request is received. The purge request may for example be received at core CPx 201. For example, the request may be referred to as FQUI purge request. In this example, receiving core CPx supports two threads TH0 and TH1. The purge request is for purging one or more entries in a TLB (e.g. TLB2 215) of the receiving core CPx.

Upon receiving the purge request, it may be determined (inquiry 403) if the two threads TH0 and TH1 require access to an entry of the entries to be purged. This may for example be determined by translator controls 212. A thread requiring access to an entry of the entries to be purged by the received purge request may be referred to as honored thread otherwise it may be referred to as a filtered thread.

In case (inquiry 403) both threads TH0 and TH1 do not require access to entries to be purged steps 405-408 may be executed. In case (inquiry 403) at least one thread (TH0 and/or TH1) requires access to at least one entry of entries to be purged steps 409-435 and 408 may be executed.

In step 405, the purge request may start at the TLB 215 (the TLB purging starts). Upon starting the TLB purging method of FIG. 4C may be executed (at point B of the diagram). A check may be performed if the TLB purging ends (inquiry 407), which indicates the end of the purge request in step 408

In step 409, the two threads TH0 and TH1 may be blocked such that the threads TH0 and TH1 are prevented from sending address translation requests to the TLB. For that, for example, asynchronous interrupt controls 220 may cause the setting of a FQUI interrupt for both threads TH0 and TH1 and the internal fast-quiesce interruption 226 to be pending for both threads TH0 and TH1. This further causes execution controls 222 to suspend program instruction processing, at the next interruptible point for each of the threads TH0 and TH1. Executing of step 409 triggers the execution of the method of FIG. 4B (at point A of the diagram).

In step 411, a branch point having two states may be set via the FQUI interrupt for each of the two threads TH0 and TH1.

In a first state of the branch point the thread (TH0/TH1) branches around the branch point into a blocking state for blocking translation request to the TLB. And, in a second state of the branch point the thread branches around the branch point into an unblocking state for enabling translation requests submission to the TLB by the thread.

It may be checked (inquiry 413) if both threads 413 have reached the respective interruption points which is referred to in the figure as a check if the received FQUI purge request is started at the TH0 and TH1. In case, both threads TH0 and TH1 have reached the interruption point, the TLB purging may start in step 415 at the TLB 215. Upon starting the TLB purging method of FIG. 4C may be executed (at point B of the diagram).

Upon starting the TLB purging in step 415, it may be determined (inquiries 417 and 425) which of the threads TH0 and TH1 is a honored thread and which one is filtered.

In case (inquiry 417) TH0 is a filtered thread and TH1 is a honored thread, the branch point may be reset in step 419 for the thread TH0, thereby unblocking the thread TH0 such that translation requests may be sent by thread TH0. And only in case (inquiry 421) the TLB purge is done that the branch point is reset in step 423 for the thread TH1 thereby unblocking the thread TH1 such that translation requests may be sent by thread TH1.

In case (inquiry 425) TH1 is a filtered thread and TH0 is an honored thread, the branch point may be reset in step 427 for the thread TH1, thereby unblocking the thread TH1 such that translation requests may be sent by thread TH1. And only in case (inquiry 429) the TLB purge is done that the branch point is reset in step 431 for the thread TH0 thereby unblocking the thread TH0 such that translation requests may be sent by thread TH0.

In case none of the threads TH0 and TH1 is a filtered thread, only in case (inquiry 433) the TLB purge is done that the branch point is reset for both threads TH0 and TH1 in step 435.

Figure 4B:
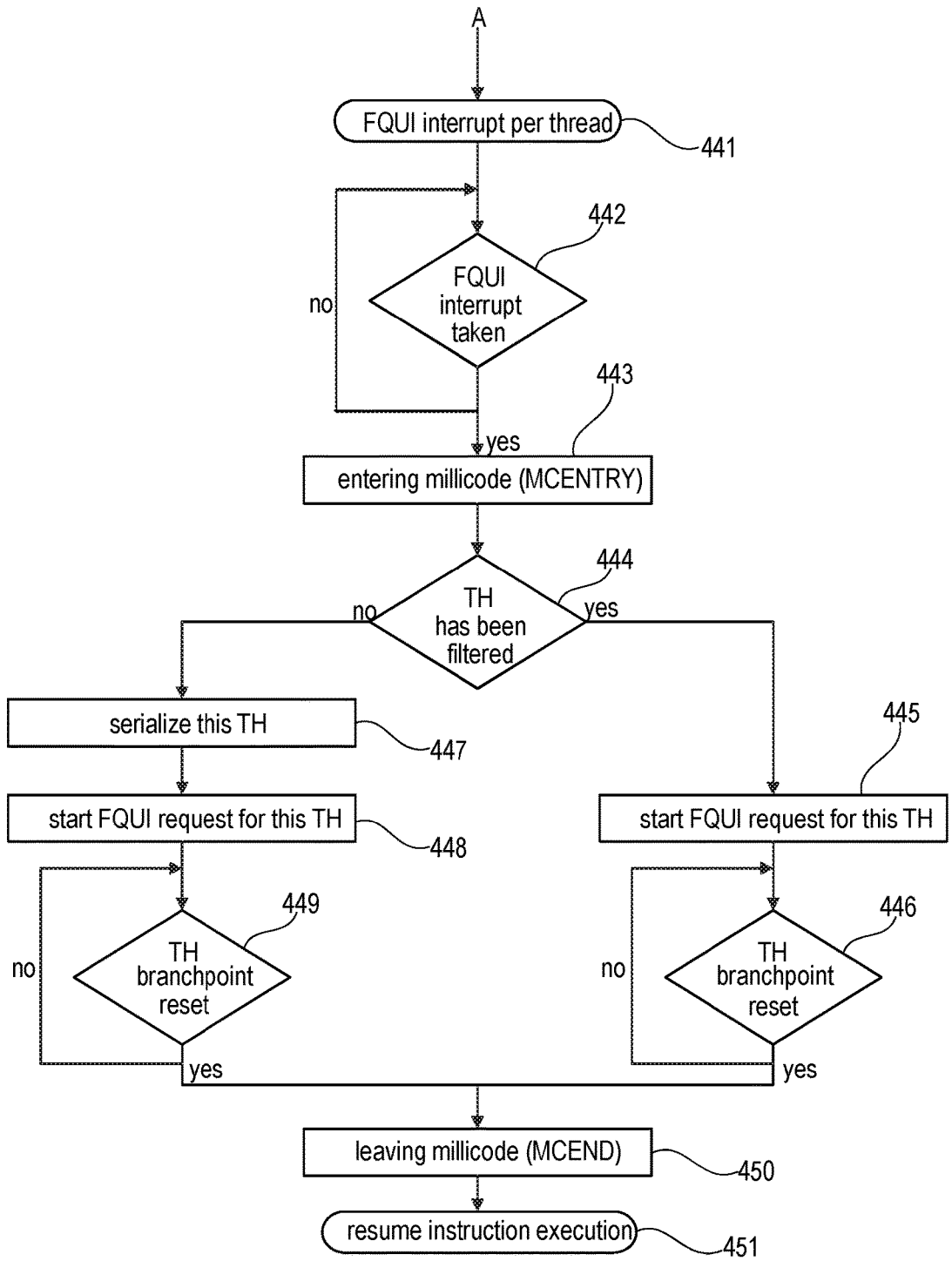
FIG. 4B is a flowchart of a method for interrupting threads in accordance with an example of the present disclosure

FIG. 4B is a flowchart of a method for interrupting the threads TH0 and TH1 in accordance with an example of the present disclosure.

FIG. 4B describes the setting of the FQUI interrupt per thread of the two threads TH0 and TH1. The FQUI interrupt may be set for the thread in step 441.

In case (442) the FQUI interrupt is taken by the thread, a millicode routine of the receiving core CPx may be used in step 443 to block or prevent the thread to send translations requests to the TLB. This is referred to as the thread has entered the millicode.

After being blocked by the millicode, it may be determined (inquiry 444) if the thread is a filtered thread. In case, the thread is a filtered thread, the FQUI request may start at the thread in step 445. Upon starting the FQUI request at the thread, it may be determined (inquiry 446) if the branch point is reset for the thread. In case, the branch point is reset for the thread, the millicode routine may be configured such that it does not block the translation requests of the thread in step 450. This is also referred to as the thread is leaving the millicode.

Upon executing step 450, the execution of the instructions of the thread may be resumed in step 451.

In case, the thread is a not a filtered thread, the thread is serialized in step 447 and steps 448-451, wherein steps 448 and 449 are similar to steps 445 and 446.

Figure 4C:
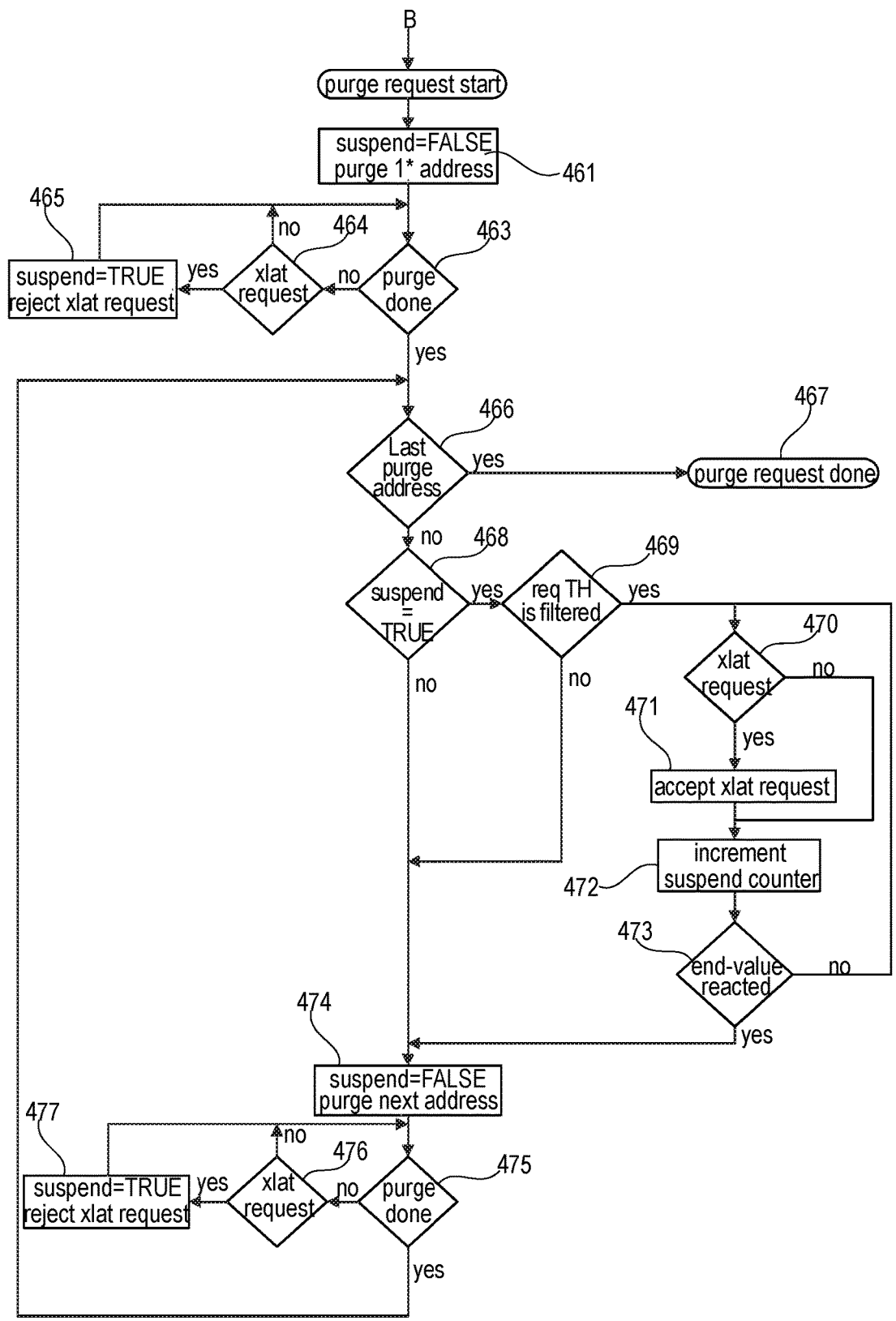
FIG. 4C is a flowchart of an example method for suspending the execution of the purge request.

FIG. 4C is a flowchart of an example method for suspending the execution of the purge request. The method of FIG. 4C may be executed per thread TH0 and TH1.

In step 461, a suspend status flag may be set to FALSE to indicate that the execution of the purge request for an entry having a 1st address is not suspended.

And it may be determined (inquiry 463) if the purge of the entry having the 1st address is done. In case, the purge of the TLB is not done yet for the 1st address, and a processor request such as an address translation request (referred to as "xlat request") is received (464) e.g. from the tread 240 the suspend status flag may be set to TRUE in step 465 and the processor request is rejected.

In case (inquiry 463) the purge of the entry having the 1st address is done, and in case (inquiry 466) there are still additional one or more entries to be purged, it may be checked (inquiry 468) if the suspend status flag is set to TRUE or not.

In case (inquiry 468) the suspend status flag is set to TRUE, and in case (inquiry 469) the thread is a filtered thread, it may be determined if (inquiry 470) a processor request such as xlat request is received from the thread.

In case a processor request is received (inquiry 470) from the thread, the request is accepted in step 471 such that it can for example be executed on TLB 215 and thereafter a suspend counter is incremented in step 472. The suspend counter may for example be an integer value that is initiated to 0, and the increment of the suspend counter is by 1.

In case a processor request is not received (inquiry 470), step 472 may be executed.

And it may be determined if (inquiry 473) the suspend counter has reached a predefined threshold value.

In case (inquiry 473) the suspend counter has not reached the predefined threshold value, steps 470-473 may be repeated.

In case (inquiry 473) the suspend counter has reached the predefined threshold value, steps 474-477 may be executed. Steps 474-477 are similar to steps 461-465.

In case (inquiry 468) the suspend status flag is set to FALSE, steps 475-477 may be executed.

Figure 5:
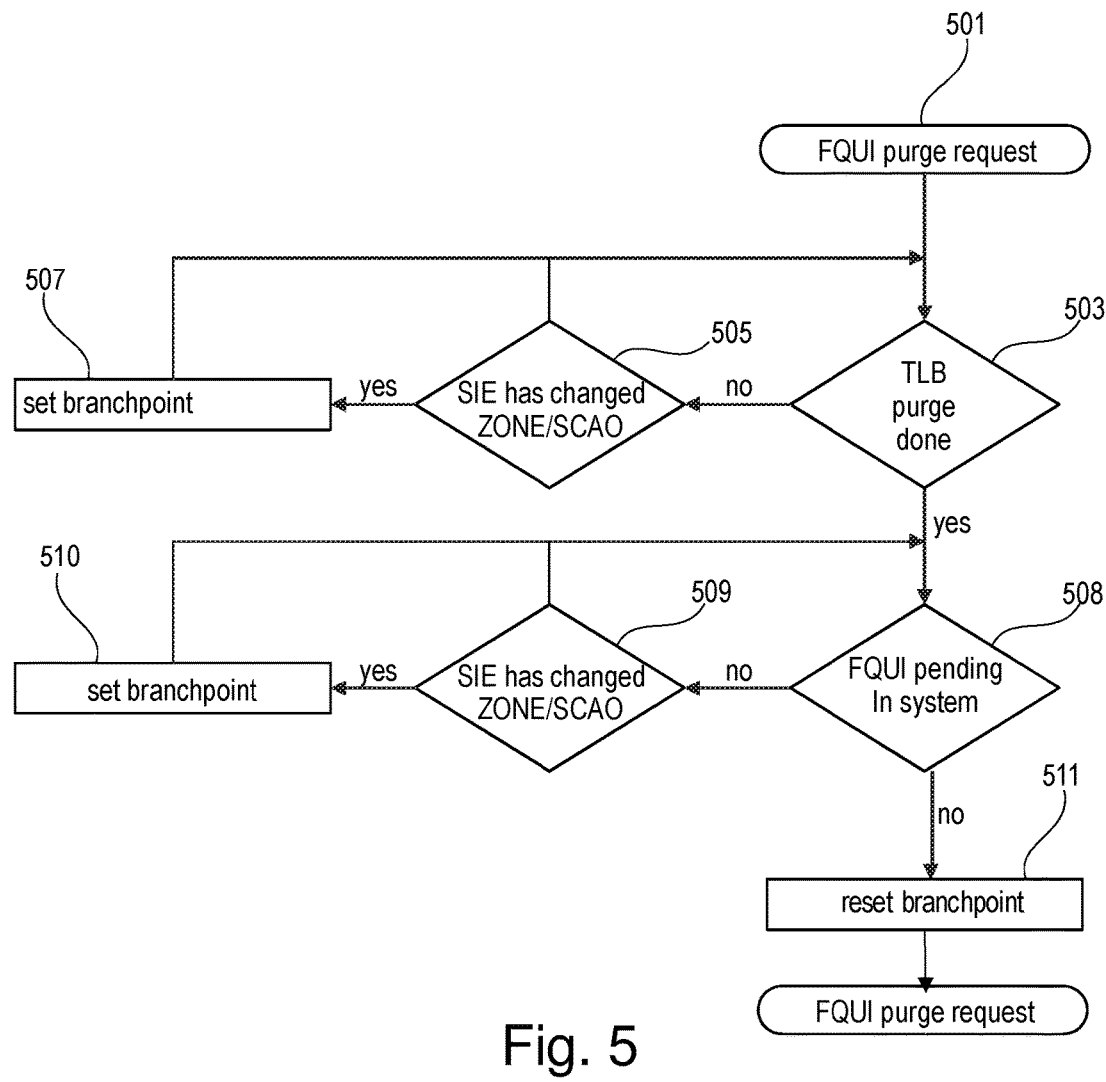
FIG. 5 is a flowchart of a method for processing purge requests in a virtualized environment.

FIG. 5 is a flowchart of a method for blocking SIE requests while processing the FQUI purge request 501 in accordance with an example of the present disclosure.

It may be determined (inquiry 503) if the purging of the TLB is done. In case, the purge of the TLB is not done yet, and in case (inquiry 505) a SIE request has been received to change the configuration associated with the thread a branch point state may be set in step 507 such that the SIE request that changes the configuration of the thread are blocked. In the guest2 environment, hypervisor2 (e.g. 109) may specify the origin of an area called the System Control Area (SCA). An example of the SIE request referred to in FIG. 5 is an SIE request for changing ZONE/SCAO. SCAO stands for SCA Origin. The SCAO may be changed within a given zone (ZONE) or virtual machine.

In case (inquiry 503) the purging of the TLB is done, it may be determined (inquiry 508) if the FQUI request is still pending. For example, it may be determined the internal fast-quiesce interruption 226 of the thread is still pending.

In case (inquiry 508), the FQUI request is still pending, and in case (inquiry 509) a SIE request has been received to change the configuration associated with the thread a branch point state may be set in step 510 such that the SIE request that changes the configuration of the thread are blocked.

In case (inquiry 508), the FQUI request is not pending the branch point may be reset in step 511 such that the SIE requests may be enabled.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for operating translation look-aside buffers, TLBs, in a multiprocessor system, the multiprocessor system comprising at least one core each supporting at least one thread, the method comprising:
receiving a purge request for purging one or more entries in the TLB;
determining if a thread requires access to an entry of the entries to be purged;
when the thread does not require access to the entries to be purged:
starting execution of the purge request in the TLB;
setting a suspension time window wherein the setting of the suspension time window is performed in response to an address translation request of the thread being rejected due to the TLB purge, wherein setting further comprises providing a level signal having a predefined activation time period during which the level signal is active, wherein the suspension time window is the predefined activation time period, and wherein a rejected address translation request is recycled during a recycling time window, wherein the recycling time window is smaller than the suspension time window;
suspending the execution of the purge during the suspension time window;
executing address translation requests of the thread during the suspension time window wherein the executing of the address translation requests of the thread comprises executing the recycled address translation request;
resuming the purge execution after the suspension window is ended;
when the thread requires access to the entries to be purged:
providing a branch point having two states;
providing a second branch point having two states;
blocking the thread for preventing the thread sending address translation requests to the TLB with firmware instructions, wherein blocking the thread comprises setting the branch point to a first state, setting the second branch point to a third state, and reading the first state of the branch point, and reading the third state of the second branch point, for performing the blocking with firmware instructions;
upon ending the purge request execution,
setting the first branch point to a second state
unblocking the thread and executing the address translation requests of the thread;
wherein the at least one core supporting a second thread, and when a first thread does not require access to the TLB entries to be purged and the second thread requires access to an entry to be purged, before starting the execution of the purge request at the TLB:
blocking both the first and second threads for preventing them sending requests to the TLB; and
when the purge request has started at both the first and second threads, unblocking the first thread.

* * * * *